(12) United States Patent
Zhou et al.

(10) Patent No.: US 7,634,091 B2
(45) Date of Patent: Dec. 15, 2009

(54) SYSTEM AND METHOD OF HIDING CRYPTOGRAPHIC PRIVATE KEYS

(75) Inventors: Yongxin Zhou, Ottawa (CA); Stanley T. Chow, Nepean (CA)

(73) Assignee: Cloakare Corporation, Ottawa (CA)

( * ) Notice: Subject to any disclaimer, the term of this patent is extended or adjusted under 35 U.S.C. 154(b) by 684 days.

(21) Appl. No.: 10/899,012

(22) Filed: Jul. 27, 2004

(65) Prior Publication Data

US 2005/0002532 A1 Jan. 6, 2005

Related U.S. Application Data

(63) Continuation of application No. PCT/CA03/00110, filed on Jan. 30, 2003.

(51) Int. Cl.
H04K 1/00 (2006.01)
H04L 9/00 (2006.01)
H04L 9/28 (2006.01)
H04L 9/30 (2006.01)
H04L 9/08 (2006.01)

(52) U.S. Cl. .......................... 380/277; 380/28; 380/30; 380/278; 380/286

(58) Field of Classification Search .................. 380/28, 380/30, 278, 286, 277
See application file for complete search history.

(56) References Cited

U.S. PATENT DOCUMENTS 5,764,767 A 6/1998 Beimel et al.
6,035,041 A * 3/2000 Frankel et al. ................ 380/30
6,668,325 B1 * 12/2003 Collberg et al. ............. 713/194
6,748,084 B1 * 6/2004 Gau et al. .................... 380/286
7,051,200 B1 * 5/2006 Manferdelli et al. ........ 713/153
7,181,014 B1 * 2/2007 Srivastava ................... 380/278
2001/0038696 A1 11/2001 Frankel et al.
2002/0108061 A1 * 8/2002 Harrison et al. ............. 713/201
2003/0023859 A1 * 1/2003 Kiddy ......................... 713/189
2003/0037237 A1 * 2/2003 Abgrall et al. .............. 713/166

OTHER PUBLICATIONS

Handbook of Applied Cryptography By Alfred J. Menezes, Paul C. van Oorschot & Scott A. Vanstone © 1997 by CRC Press LLC Excerpt: pp. 6-9, 39-41, 50, 56-57, 76-85, 89-90, 198-200, 524-529, 613-629 & 633.*

* cited by examiner

*Primary Examiner*—Kambiz Zand
*Assistant Examiner*—Benjamin A Kaplan
(74) *Attorney, Agent, or Firm*—Jeffrey M. Measures; Borden Ladner Gervais LLP

(57) ABSTRACT

The invention relates to a system and method of hiding cryptographic private keys. While public/private key encryption systems are considered to be secure, the private keys ultimately must be stored in some location—in fact, in some digital commerce systems the private key is sent to the end user as part of an executable file such as an audio player and audio file. Thus, attackers can obtain access to the private key. The broad concept of the invention is to split the private key up into parts which are obfuscated, but still kept in a form that allows the encrypted data to be decrypted. One technique for obfuscating the private key uses modulo arithmetic.

51 Claims, 2 Drawing Sheets

SYSTEM AND METHOD OF HIDING CRYPTOGRAPHIC PRIVATE KEYS

RELATED APPLICATIONS

This application claims priority on the basis of Canadian patent application Serial No. 2,369,304 filed 30 Jan. 2002 and is a continuation of PCT Application No. PCT/CA03/00110 designating the United States and filed 30 Jan. 2003.

FIELD OF THE INVENTION

The invention relates to software and data cryptography. In particular, the invention relates to a system and method of hiding cryptographic private keys.

BACKGROUND TO THE INVENTION

In recent years, public/private-key cryptosystems have been widely used for protection of commercial data transmitted via the Internet. In addition to their use in encrypting and decrypting messages, they are used in creating and verifying digital signatures and for key exchanges. Public/private-key variants include the Rivest-Shamir-Adleman (RSA) and the ElGamal cryptosystems. The RSA cryptosystem is described in U.S. Pat. No. 4,405,829.

Based on standard RSA and ElGamal algorithms, a variety of extensions have been constructed. Threshold cryptography addresses single-secret sharing and related function sharing for multiple players. Chaum developed a blind signature scheme to allow one party to get a message signed by another party without leaking information about the content of the message to the other party (D. Chaum, Security without identification: transaction systems to make big brother obsolete, Communications of the ACM 28 (10, pp. 1030-1044, 1985.).

The RSA is a well-known and widely-used public key cryptosystem. The security of RSA is based on the intractability of the integer factorization problem. The key generation algorithm for RSA public key encryption is performed as follows:

1. Generate two large prime number p and q, each with roughly the same size (at least 100 digits). Let n=pq.
2. Select an integer e such that e is an odd integer greater than 1, less that n, and e and (p−1)(q−1) are relatively prime, i.e., $$(e, (p-1)(q-1)) = 1.$$

3. Compute an integer d such that (de−1) is evenly divisible by (p−1)(q−1), i.e., $$de = 1 (\mod (p-1)(q-l)).$$

4. The public key is e. n is the modulus.
5. The private key is d.

In this specification, the public and private key pairs will some times be referred to as (e, n) and (d, n), respectively.

The RSA public key e and modulus n are used to encrypt a message m to get cipher message c:

$$c = m^e (\mod n)$$

and private key d and modulus n are used to decrypt the cipher message c to obtain message m:

$$m = c^d (\mod n).$$

The ElGamal cryptosystem is a public key cryptosystem whose security is based on the hardness of the Diffie-Hellman problem. The key generation process is as follows:

1. The server chooses a large prime p and a generator a of the group $(Z/(p))^*$ of integers modulo p.
2. The server selects a random integer a with $1 \leq a \leq (p-2)$ and computes $\alpha^a \mod p$.
3. The public key is $(p, \alpha, \alpha^a)$ and the private key is a.

For a message m, the enciphered message is a pair of integers $(y_1, y_2)$ such that $y_1 = \alpha^k \mod p$ and $y_2 = m(\alpha^a)^k \mod p$, where k is a random integer between 1 and p−2, inclusive. The decryption is performed by computing $y_1^{-a} \cdot y_2 \mod p$.

For all these cryptosystems and their applications, the basic assumption of security is that a given private key and its associated decrypting process are physically inaccessible except to the holder of the private key. However, there are many applications which require that programs perform decryption on hostile hosts. For example, in applications including e-books and other digital rights management systems, an encrypted document will often be downloaded to the end user with a private key embedded in it. In this scenario, if the decrypting process is standard, an attacker can find the private key, and the decrypted message, by observing this executing process using debugging tools, program tracing tools, and the like.

FIG. 1 shows an example of a typical cryptosystem 10. The cryptosystem 10 comprises a server 11, a communications channel 12, and a client 13. The server 11 comprises a key generation unit 14 and a program P 17 used to encrypt messages m into ciphers c and decrypt ciphers c back to messages m. The key generation unit 14 is used to create a private key 15 and a public key 16. The private key 15 is embedded 18 into the program P 17. When the user is authenticated or otherwise obtains permission from the server 11, the public key 16 and program P 17 are then downloaded to the client 13. The public key 16 is entered into program P 17 by a user. The client comprises the public key 16, program P 17, and application 19.

Cryptosystem applications typically begin with a server generating a private and public key pairs (d, n) and (e, n), respectively. Next a program P 17 is generated which is intended to execute on a client's machine. The private key (d, n) is embedded in P, and part of P's code is able to decrypt cipher messages c encrypted by the public key (e, n).

After P 17 has been installed on the client's machine 13, a message m is created which is intended neither to be publicly acknowledged, nor to be exposed, to the user of the client 13. The message m is encrypted by program P 17 on the server 11 using the public key 16. This encryption process produces a cipher c which is sent to the client 13 via the communications channel 12. The cipher c is decrypted by program P 17 on the client 13 using the embedded private key 18. The decrypted message m is then passed on to the appropriate application 19 in the client 13. The application 19 may for example be an audio player, video player or e-book application.

The message m is not intended to be exposed to the user of the client 13 other than indirectly through the application 19. That is, it is preferable that the message m is played or otherwise processed by the application 19, but that it not be available to an outside observing for copying or transferring to others. However, the decryption of message m causes the states of P 17 to be changed according to the contents of message m. These changes in states may be observed by a hostile user of client 13 using techniques as described above. The observation by the hostile user may expose the embedded private key d and the message m.

In this situation, the client is a legitimate but untrusted party, from the server's point of view. In this scenario, it is desirable to have communication security between the server and the client to protect message c. It is also desirable to have means for protecting the private key d and the decrypted message m from the client.

SUMMARY OF THE INVENTION

It is an object of the present invention to solve one or more of the problems described above by providing a means for BLIND USE OF PRIVATE KEYS, in the sense that private keys can be used without being revealed. For example, by means of the instant invention, standard RSA and ElGamal cryptosystems can be modified to permit BLIND USE OF THEIR PRIVATE KEYS. This method can be employed so that breaking the resulting communication security is equivalent to solving the Discrete Logarithm Problem (DLP), which is generally agreed to be infeasible to solve in practice.

In a private/public key cryptography system, the private and public keys are compliments of one another and the private key can decipher data that has been encoded using the public key. The system is secure because the private key cannot easily be resolved from a knowledge of the public key and/or an encoded file.

The private key contains all the information needed to decode the encoded file. The broad concept of the invention is to divide this private information into two or more parts and then to obfuscate at least one of these parts, but still keep it in a form for which it is useful. Observers cannot resolve the obfuscated portions of the private key back to the original private key yet the obfuscated portions of the private key can still be used to decipher the ciphered data. A number of techniques are presented for doing this.

The entire deciphering program and data application (such as an audio or video player) are also preferably cloaked using tamper resistant software encoding techniques. In this way the unencoded data is never easily observable.

One aspect of the invention is broadly defined as a method for blind use of private cryptographic keys comprising the steps of: splitting the private key up into parts; and obfuscating at least one of the parts of the private key; whereby the private key is restructured so that it can be used without being revealed to an observer.

Another aspect of the invention is defined as a system for secure communication comprising: a first computer; a second computer; a communication network for interconnecting the first computer with the second computer; the first computer being operable to: generate a private and public key pair; split the private key into a first part and a second part; encrypt a message using the public key; transmit to the second computer: the public key; the first part of the private key; a program for decrypting messages; obfuscate the second part of the private key; and transmit the encrypted message and the obfuscated second part of the private key to the second computer; whereby the second computer can decipher the cipher using the first part of the private key and the obfuscated second part of the private key.

BRIEF DESCRIPTION OF THE DRAWINGS

A better understanding of the invention will be obtained by considering the detailed description below, with reference to the following drawings in which.

DETAILED DESCRIPTION

In this description, RSA cryptosystems will be described. However, the invention applies to other cryptosystems, including Diffie-Hellman cryptosystems such as the ElGamal cryptosystem, as will be described below.

Figure 1:
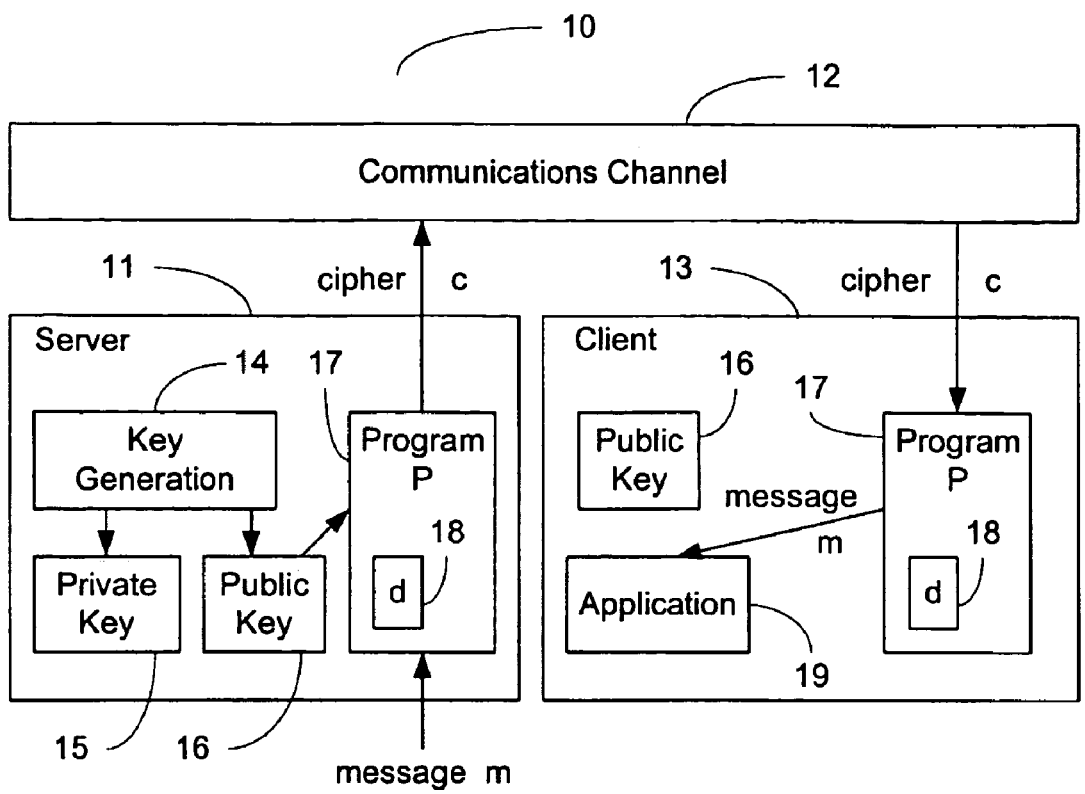
FIG. 1 shows an example of a typical cryptosystem.
Figure 2:
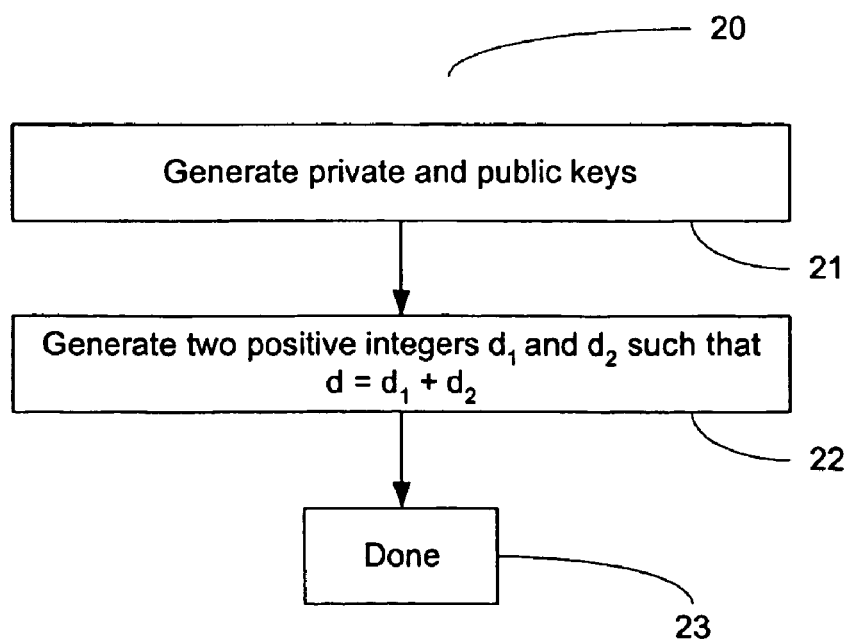
FIG. 2 shows an example of a method of key generation for us in hiding a private key of a cryptosystem, in accordance with an embodiment of the present invention.

FIG. 2 shows an example of a method of key generation (20) for use in hiding a private key (d, n) of a cryptosystem, in accordance with an embodiment of the present invention. The method begins with the server 11 generating private 15 and public 16 key pairs (d, n) and (e, n), respectively (21). Next, the server selects two positive integers $d_1$ and $d_2$ such that $d=d_1+d_2$ (22). The key generation method is done (23). Key information (e, n, $d_1$) may now be distributed to the client 13, that will save (e, n, $d_1$) for future use. The server 11 may also create deciphering program P 17 for installation on client 13.

Figure 3:
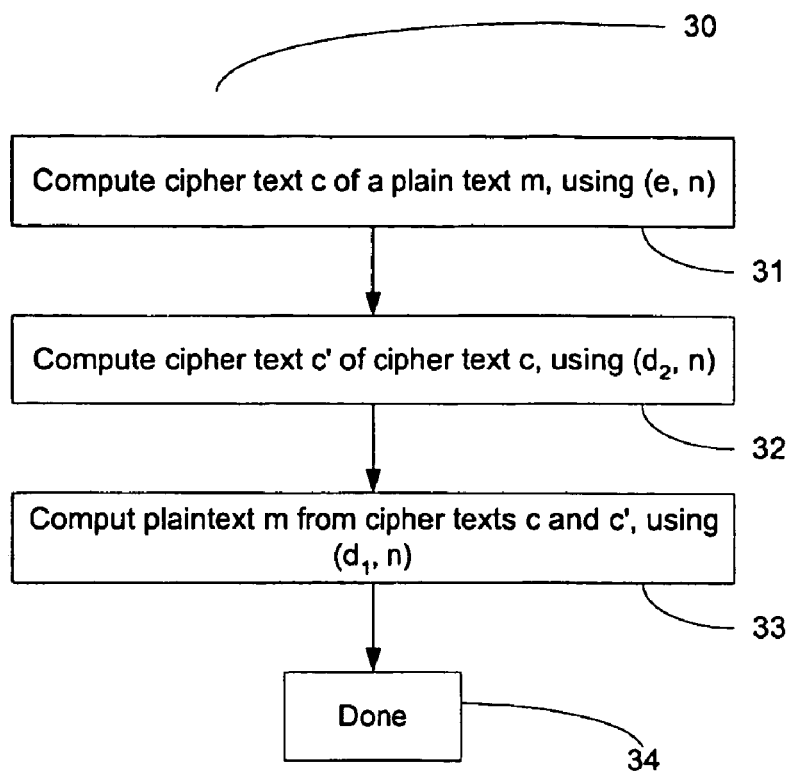
FIG. 3 shows an example of a method of message encryption and decryption when hiding a private key of a cryptosystem, in accordance with an embodiment of the present invention.

FIG. 3 shows an example of a method of message encryption and decryption (30) when hiding a private key d of a cryptosystem 10 in the manner of FIG. 2, in accordance with an embodiment of the present invention. The method begins with computing the cipher text c of a plain text m (31), where $c=m^e \pmod n$. Next, the cipher text c' of cipher text c is computed (32), where $c'=c^{d_2} \pmod n$. The server passes c and c' to the client. The client receives c and c' and program P 17 computes the plain text m (33) by performing the calculation $m=(c' \cdot c^{d_1}) \pmod n$. The method is done (34).

The difficulty of finding d based on the information available to the client 13 is equivalent to the difficulty of solving the discrete logarithm problem (DLP). The reason is that finding d requires finding $d_2$ from c', which is a DLP.

This protocol may be used to send out messages through common (i.e., shared, open or public) communication channels 12 because it ensures the safety of the private key d.

Means for protecting the private key d and the decrypted message m from the client is related to the production of tamper resistant software (TRS), and to methods of software obfuscation in general. Deployed in program P, the methods can be used to create a tamper resistant environment for the application of TRS technologies. The goal is make it very difficult for a user of client 13 to extract the private key d from P and hard to understand the decryption process as well as the usage of decrypted messages. (See PCT/CA00/00678, PCT/CA00/00943, WO 01/79969, Canadian Patent Application No. 2,327,911, and WO 99/01815 for examples of suitable TRS encoding techniques.)

Since RSA and Diffie-Hellman cryptosystems involve modular exponentiation operations, which are computationally expensive, using a fast implementation algorithm, such as addition chains, is desirable.

The addition chain concept was developed to compute powers (i.e., to perform exponentiation) efficiently. An addition chain for number d is a sequence of positive integers $$1=a_0, a_1, a_2, \ldots, a_r=d$$

with the property that for each i=1, 2, . . . , r, $$a_i = a_j + a_k$$

for some k, j with $k \leq j \leq 1$.

For two positive integers m and d, computing md is equivalent to computing some $m^{a_i}$s. Each positive integer d has many addition chains. Its binary addition chain is one of them. Finding an efficient way to perform exponentiation is identical to finding a shortest addition chain for d. Each addition chain can be represented by a special directed acyclic graph G=(V, E). Each number $a_i$ in the chain is represented by a node $v_i \in V$. The relation $a_i = a_j + a_k$ is represented by two edges $(v_j, v_i) \in E$ and $(v_k, v_i) \in E$.

For three positive integers m, n and k, an addition chain of m×n+k can be obtained from addition chains of m, n and k. The source vertex and sink vertex are two important controllers of an addition chain. These two controllers can be used to obfuscate the decryption process.

If R is an associative ring with unity and G is a group, one defines the group ring RG to be the set of all the element of the form $$\sum_{g \in G} r_g g$$

with addition $$\sum_{g \in G} r_g g + \sum_{g \in G} s_g g = \sum_{g \in G} (r_g + s_g) g$$

and multiplication $$\sum_{g \in G} r_g g * \sum_{h \in G} s_{gh} = \sum_{g \in G} (r_g + s_h) gh$$

where $r_g \in R$, $s_h \in R$ for all g, h∈G.

A group ring is an associative ring. An invertible element u∈RG is called a unit of RG. The set of all units of a group ring is a group under the multiplication operation of the group ring. The units so defined, are used to create mappings with which to obfuscate the decryption process.

After both public and private keys have been generated, the server 11 can do some pre-calculation on the private key d. Let 1 be the binary size of d. In practice, 1 could be 512 or 1024 bits long.

Based on the equation $m = c^d \pmod{n}$, where c is the cipher message, n is the modulus and m is the original message, there are a number of mathematical forms for the representation of the private key d. Two criteria may be set for any such form of representation: the first criterion is that it should facilitate key obfuscation, and the second is that it should facilitate fast computation as much as possible.

For any positive integer t≦d, a private key d can be represented as $$d = d_1 + d_2 + \ldots + dl$$

where $d_i$ are positive integers, for i=1, ..., t.

Therefore $$m = c^d \pmod{n} = c^{d_t} \pmod{n} \cdot c^{d_2} \pmod{n} \ldots c^{d_1} \pmod{n}$$

In this way computing m becomes a process of computing t modular exponentiation operations and t−1 modular multi-plications. The original key d is not involved directly. This representation of d is referred to as the summand representation.

Let p(d) denote the number of partitions of d into summands. The lower boundary of p(d) is $2[\sqrt{d}]$.

Another representation of d can be obtained from its binary representation, which is itself an encoding of an additive partition. For a given integer d it can also be written in the form $$d = d1*(2^{i1}) + d2*(2^{i2}) + \ldots + dj*(2^{ij}) + \ldots + dt*(2^{it})$$

where $d_j$ and $i_j$ are integers, for all j=1, 2, ..., t. Let 1(d) be the number of bits of d. Then the number of binary representations of d is the number of partitions of 1(d) into summands. This form of representation will be referred to as binary representation.

The directed graph of an addition chain for d provides with yet another representation of d. For a given number d, there are many addition chains corresponding to d. In fact, determining the shortest addition chain for d is np-hard. The term graph representation refers to a directed graph representation of an addition chain for d.

Since any power can be represented in any one of the three forms above, and all $d_j$s in the summand representation, all $d_j$s and $i_j$s in the binary representation, and all nodes in the graph representation are part of a power, they can be represented in other forms. For example, $d_j$s in summand representation could be represented as instances of a graph representation. On the other hand, each node in a graph representation could be denoted by a binary representation. For a given private key, these combinations can create many different representations.

Program P is created by the server, and the way of decrypting a message is also designed by the server. Therefore the server can encode private key d and decode it in the decrypting process in P. Two ways of encoding a key include linear mapping and group ring mapping. Note that all three key representations mentioned above can be implemented using arrays, although elements in their cells or elements will have different interpretations, depending on the intent (i.e., depending on which of the above representations is being used). The server may insert random values into these arrays for further obfuscation.

The basic idea behind the linear mapping method is to use an invertible matrix to encrypt the array elements. First, select a prime number p which is greater than all of the array elements of a key representation, and then set the base ring of the matrix to be Z=(p), where Z is the integer domain. An invertible matrix H will be selected over Z=(p).

Some number of random values can be inserted into the private key bits. These values can be used for row or column bits in the matrix H.

The following will describe the use of a group ring to perform the encoding. Let G be a finite group, $G = \{g_1, g_2, \ldots, g_{|G|}\}$, with order |G|.

A first approach employs group ring ZG, where Z is the ring of the integers.

Let f be a bijection from ZG to ZG. There exist many such kinds of maps. For example, one can choose a unit u from U(ZG) and define f by $$f(x) = u^{-1} x u$$

for any x∈ZG. Since u is invertible, map f is a bijection.

We show that each segment of length |G| in the array of a key representation can be encoded by f. Let $$S = \{a[i], a[i+1], \ldots, a[i+|G|]\}$$

be a segment of the integer array of a key representation. Then an element $x_S \in ZG$ can be defined by $$xS = a[i]g_1 + a[i+1]g_2 + \ldots + a[i+|G|]g_{i+|G|}$$

Acting f on $x_s$ we get $f(x_s)$. Suppose $$f(x_s) = b_1 g_1 + b_2 g_2 + \ldots + b_{|G|} g_{|G|}$$

Then we have an encoded segment S' of segment S, viz.:

$$S' = \{b_1, b_2, \ldots, b_{|G|}\}$$

Since f is invertible, S can be recovered from S'.

Key-representation arrays may be partitioned into segments of length |G|, thus producing encoded arrays.

There is another way to do array encoding: instead of working on the integer ring Z, work on the Galois field GF $(2^1)$ and use the group ring GF $(2^1)$ G to encode the key representation array, where 1 is an integer called the word length. In this way, an array can be partitioned into segments and each segment has |G| words, while each word has 1 bits. It is well known that each word can be regarded as an element in the Galois field GF $(2^1)$.

Following the same procedure, each segment can be encoded into a new segment by applying f which is a bijection from GF $(2^1)$ G to itself. Then the whole array can be encoded, segment by segment.

For a given array representing a key, different methods (linear mapping or group ring mapping) may be applied on it. For the same mapping, different parameters can be selected. For example, different matrices for linear mappings, different types of groups, and different representations of the same type of group, and different rings for group ring mappings. Applying different methods, or the same method with different parameters, makes it more difficult to find the private key, and more difficult to understand the decryption process.

In program P, based on the key hiding scheme above, and the encoded key representation, above, the decrypted message will be represented by a message array mixed with some false values. Only by finding the right pieces and combining them together in the correct way can the true decrypted message be determined. This tamper resistant environment provides a way to apply tamper-resistant technologies (which is recommended to fully obfuscate the decryption process).

Figure 4:
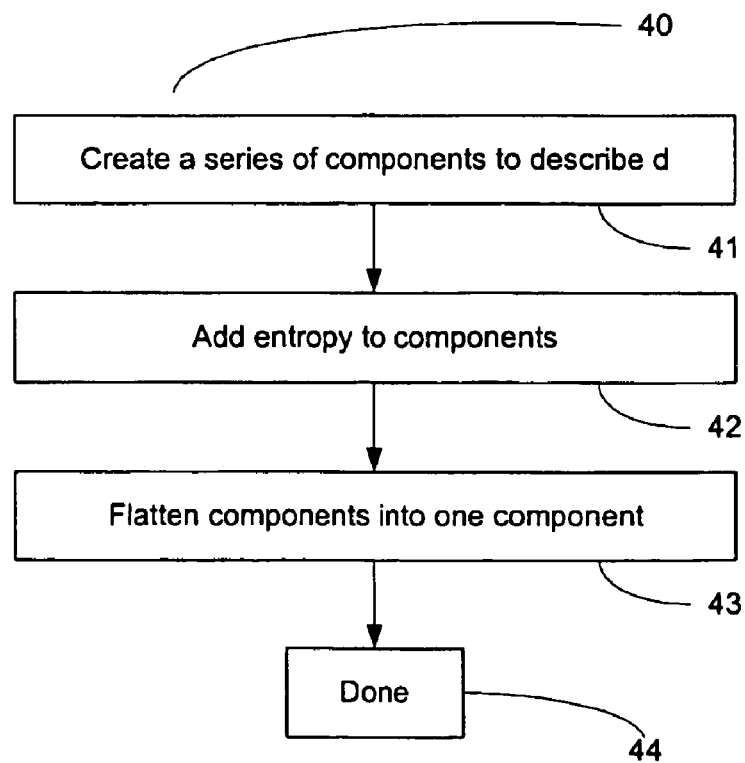
FIG. 4 shows an example of a method of hiding a private key in a program, in accordance with an embodiment of the present invention.

FIG. 4 shows an example of a method of hiding a private key d in a program P (40), in accordance with an embodiment of the present invention. The method begins with a generated private key d. A series of components are created to describe d (41). Entropy may be added to the components (42). For example, entropy may be added as random values in the components. Alternatively, entropy may not be added. However, it is preferable to add entropy to further obfuscate the private key component representation of d. The components are then flattened into one component (43). For example, the components may be flattened into an array. The method is done (44) and this flattened component is then used to represent d in program P. The following description will describe features of this method in more detail.

An example of a method to hide d based on its binary representation is provided. A binary representation for private key d of RSA will be described. At this stage, d is assumed to have been generated as a big integer. More precisely, let d be the key with binary size keySize. Two integer arrays will be used to describe d: keyCoefficients [ ] and keyExponents [ ] with the same size keyPartitionSize.

The two arrays can be filled in the following way. Based on the bit size of keySize, the keyPartitionSize can be determined. Then keyPartitionSize of values $\{p_1, p_2, \ldots p_{keyPartitionSize}\}$ are randomly chosen such that their sum is keySize.

The bit-vector OF D is partitioned into keyPartitionSize consecutive bit-vectors $v_i$ of bit length $p_i$ with value $w_i$, and let keyCoefficient[i]=$w_i$ and let keyExponents [i] be the bit position of the low-order bit of $v_i$ in the bit vector of d, where i=0, . . . , keyPartitionSize−1. Then $$d = \sum_{i=1}^{keyPartitionSize} keyCoefficients[i] x 2^{keyExponents[i]}$$

Some randomness may be injected into both arrays in order to obfuscate key d. Two arrays are created to store true values and entropy for keyCoefficients [ ] and keyExponents [ ], called coefficientsAndEntropy [ ] and exponentsAndEntropy [ ], respectively.

Values of array coefficientsAndEntropy [ ] based on the keySize may be set, and an entropyNumber of random values may be determined based on the keyPartitionSize. Then these values may be randomly inserted into the array coefficientsAndEntropy [ ].

In this way, coefficientsAndEntropy [ ] contains both real data and random values. The indices of the spurious (random) entries will be stored in an array called coefficientEntropyNumberIndices [ ].

Now a way to set the elements of exponentsAndEntropy [ ] will be described. The same number of random values entropyNumber will be used. All the random values must lie between 1 and keySize, since the values in keyExponents [ ] is an ascending chain. exponentsAndEntropy [ ] can be constructed from keyExponents [ ] and these random values.

A group ring mapping may be used to encode the two arrays. A non-Abelian group G with order |G| is selected and a unit u from ZG is found. Then a map is defined from ZG to ZG by $$f(x) = xu$$

for any x∈ZG. Since u is invertible, map f is a bijection.

Two two-dimensional arrays may be created for this purpose: namely, coefficientGRElements [ ] and exponentGRElements [ ] [ ]. Each sub-array in these two dimensional arrays is a group ring element.

Based on the order of G, the two arrays coefficientGRElements [ ] and exponentGRElements [ ] [ ] may be set, whose elements are assigned from coefficientsAndEntropy [ ] and exponentsAndEntropy [ ], respectively. Then map f may be applied to this group ring elements to form two new arrays denoted by the same names, coefficientGRElements [ ] and exponentGRElements [ ] [ ], which is the last step of private key pre-calculation.

Since the group G is selected by the server, the group table can be related to the private key bits, which makes it more difficult to find private key d.

After this pre-calculation, all of the information related to recovery of the private key is hidden and scattered in two obscured arrays which will be flattened to a one dimensional array in program P, using known compiler techniques for array addressing. Program P will use this array to perform decryption.

The ElGamal cryptosystem is a public key cryptosystem whose security is based on the hardness of the Diffie-Hellman problem. The key generation process is as follows:

1. The server chooses a large prime p and a generator $\alpha$ of the group $(Z=(p))^*$ of integers modulo p.
2. The server selects a random integer a with $1 \leq a \leq (p-2)$ and computes $\alpha^a \bmod p$.
3. The server's public key is $(p, \alpha, \alpha^a)$ and the private key is a.

For a message m, the enciphered message is a pair of integers $(y_1, y_2)$ such that $y_1 = \alpha^k \bmod p$ and $y_2 = m \cdot \bmod p$, where k is a random integer between 1 and p−2, inclusive.

The decryption is performed by computing $y_1^{-a} \cdot y_2 \bmod p$. As with RSA, in the decrypting process, the private key of ElGamal is used in the form of a power (for exponentiation). Therefore all of the techniques mentioned above for RSA cryptosystem can be applied to the ElGamal cryptosystem.

The method provides a way for hiding cryptographic keys and messages by splitting and obfuscating the private keys and their corresponding decryption process. The method can be combined with other forms of program obfuscation and techniques for the generation of tamper-resistant software to produce implementations in which both private keys and messages would be difficult for an attacker to discover.

Protection of the software application P could be effected by means of tamper-resistant encoding techniques known in the art. Preferably, TRS encoding techniques described by Cloakware in co-pending applications should be used to protect the data-flow, control-flow, mass data and processing (referred to as "white-box cryptography").

Data-flow refers to the 'ordinary computation' of a program: addition, subtraction, multiplication, division, Boolean computations, masking operations, and the like: the scalar data-flow of a program. Data-flow encoding alters the frame of reference for the data in the program, so that an attacker cannot easily determine how the program is operating. For example, a transform can be effected on each integral variable in a program, changing it to a geometric sum. Details on the various forms of data-flow encoding are available in the co-pending patent application titled: Tamper Resistant Software Encoding, filed under the Patent Co-operation Treaty on Jun. 8, 2000, under Ser. No. PCT/CA00/00678, by Stanley Chow, Harold Johnson, and Yuan Gu.

Control flow encoding is used to encode and protect the control logic, branch, and subroutine structure of the program by altering these structures and the decision branches that access them. Various control flow encoding techniques are described in the co-pending patent application filed under the Patent Cooperation Treaty application no. PCT/CA00/00943, titled: Tamper Resistant Software-Control Flow Encoding.

The term mass data refers to aggregate data structures of various kinds, such as arrays, character strings, records with named fields, discrete unions, records linked by pointers and residing in dynamic or 'heap' storage, I/O buffers, command buffers, and the like. Accordingly, mass-data encoding protects the contents of these data structures.

Mass data encoding generally relies on the random or pseudo-random dispersion of data being stored, throughout the available memory or an area of the available memory. This dispersion makes it very difficult for an attacker to locate certain pieces of data he is searching for, and also distributes the data values with respect to one another. Details on mass data encoding appear in: Tamper Resistant Software-Mass Data Encoding, filed under the Patent Co-operation Treaty on Apr. 12, 2001, under Ser. No. PCT/CA01/00493); inventors: Stanley Chow, Harold Johnson, and Yuan Gu.

White-box cryptography protects cryptographic computations so that they can be performed without revealing internal data such as encoding constant or secret keys. White-box cryptography is described in the co-pending patent application filed under the Patent Cooperation Treaty application no. PCT/CA01/00493, titled: Tamper Resistant Software-Mass Data Encoding.

While particular embodiments of the present invention have been shown and described, it is clear that changes and modifications may be made to such embodiments without departing from the true scope and spirit of the invention.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CO-ROMs, Random Access Memory (RAM), Read Only Memory (ROM) or similar computer software storage media known in the art, may store code to execute such method steps.

While exemplary embodiments described herein focus on particular public/private-key cryptosystems, it would be clear to one skilled in the art that the invention may be applied to other public/private-key cryptosystems. The protected software of the invention can be stored on any suitable storage device and executed on any manner of computing device. It is just as mobile as any other software application, and can be downloaded to users over the Internet or via email, transferred from a personal computer (PC) to a laptop, or stored on a CD ROM or hard disk drive. Accordingly, the invention could be applied to:

1. computers such as personal computers, personal digital assistants, laptop computers and other similar devices;
2. network and system components such as servers, routers, gateways and other similar devices; and
3. all manner of appliances having computer or processor control including electronic books, mp3 players, CD readers and players, DVD players and the like.

What is claimed is:

1. A computer implemented method of hiding a private key comprising the steps of:
   generating a private and public key pair at a single server;
   splitting said private key into a first part and a second part;
   providing to a single client:
      said public key;
      said first part of said private key; and
      a program configured to decrypt messages;
   using said public key and a modulus to encrypt a message into a cipher;
   obfuscating said second part of said private key; and
   providing said cipher and said obfuscated second part of said private key to said client; and
   deciphering said cipher at the client using said first part of said private key and said obfuscated second part of said private key.

2. The method of claim 1, wherein said first part of said private key is embedded into said program for decrypting messages.

3. The method of claim 2, wherein said step of obfuscating said second part of said private key comprises the step of generating a second cipher using said second part of the private key to encrypt said first cipher.

4. The method of claim 3, wherein said private key is an RSA private key.

5. The method of claim 3 wherein said step of obfuscating comprises the step of generating a series of components which describe said second part and further comprises the steps of inserting entropy into said series or set of components.

6. The method of claim 5 wherein said step of obfuscating comprises the step of mixing random or pseudo-random values in with said series or set of components.

7. The method of claim 5 wherein said step of obfuscating comprises the step of inserting entropy into said series or set of components by means of a linear mapping.

8. The method of claim 5 wherein said step of obfuscating comprises the step of inserting entropy into said series or set of components by means of a group ring mapping.

9. The method of claim 3 wherein said step of obfuscating comprises the step of generating a series of components which describe said second part and further comprises the steps of encrypting said series or set of components.

10. The method of claim 2, wherein said executable program is protected using tamper resistant software encoding techniques.

11. A computer implemented method that transforms a software application from a first form to a more secure form allowing the blind use of private cryptographic keys wherein said first form includes a single private key, said method comprising the steps of:
splitting said private key up into parts; and
obfuscating at least one of said parts of said private key;
producing said more secure form in which said private key is restructured so that it can be used without being revealed to an observer;
said step of splitting comprises the step of: partitioning said private key by exploiting mathematical properties of said private key;
said private key is restructured by obfuscating the parts into which it is partitioned, within a public application.

12. The method as claimed in claim 11, wherein said splitting comprises breaking the private key into a first part and a second part.

13. The method as claimed in claim 11, wherein said splitting comprises breaking the private key into multiple parts.

14. The method as claimed in claim 11, wherein said splitting comprises breaking the private key into an addition chain.

15. The method as claimed in claim 11, wherein said splitting comprises breaking the private key into a base-2 polynomial.

16. The method of claim 11, wherein said step of splitting comprises the steps of:
generating a private and public key pair (d, e); and
generating partial private keys based on said private key d, and containing all of the information in said private key d.

17. The method of claim 16, wherein $d=d_1+d_2$.

18. The method of claim 17, further comprising the steps of:
sending key information (e, n, d,) to a client;
encrypting a message using said public key e to form a private key encrypted message c;
encrypting said public key encrypted message c using partial private key $d_2$ to form a partial private key encrypted message c'; and
sending said public key e, and said encrypted messages c and c' to the client.

19. The method of claim 18, wherein the private key encrypted message is computed using the formula $c=m^e \pmod n$.

20. The method of claim 19, wherein the partial private key encrypted message is computed using the formula $c'=c^{d2} \pmod n$.

21. The method of claim 20, further comprising the step of decrypting the private key encrypted message using said partial private key d, and the partial private key embedded in said partial private key encrypted message c'.

22. The method of claim 21, wherein the public key encrypted message is decrypted using the formula $m=(c' \cdot c^{d1}) \pmod n$.

23. The method of claim 11, wherein said steps of splitting and obfuscating comprise the steps of:
generating a series of components containing all of the information in said private key d; and
obfuscating one or more of said series of components.

24. The method of claim 23, wherein the step of creating comprises the step of converting d into an array of integers obtained using the summand representation:

$$d=d_1+d_2+\ldots+d_t$$

where $d_i$ are positive integers, for i=1, . . . , t.

25. The method of claim 23, wherein the step of creating comprises the step of converting d into an array of integers using binary representation:

$$d=d1*(2^{i1})+d2*(2^{i2})+\ldots+dj*(2^{ij})+\ldots+dt*(2^{it})$$

where $d_j$ and ij are integers, for all j=1, 2, . . . , t.

26. The method of claim 23, wherein the step of creating comprises the step of converting d into an array of integers using a directed graph representation of an addition chain ford.

27. The method of claim 23, wherein the step of creating comprises the step of converting d into an array of integers using a combination of two or more of a summand representation, a binary representation and a graph representation.

28. The method of claim 23, wherein the step of obfuscating comprises the step of using an invertible matrix to encode elements of an array of integers representing the series of components.

29. The method of claim 28, wherein the step of encoding comprises the steps of:
selecting a prime number p which is greater than all of the array elements;
setting the base ring of the invertible matrix to be Z/(p), where Z is the integer domain; and
selecting an invertible matrix H over Z/(p).

30. The method of claim 29, further comprising the steps of:
inserting random values into private key bits of the array; and
using the random values for row or column bits in matrix H.

31. The method of claim 23, wherein the step of obfuscating comprises the step of using a group ring to encode elements of an array of integers representing the series of components.

32. The method of claim 31, wherein the step of encoding comprises the steps of:
employing a group ring ZG, where Z is the ring of the integers and G is a group of the array elements; and selecting a bijection f from ZG to ZG to encode segments of the array elements.

33. The method of claim 31, wherein the step of encoding comprises the steps of:
employing a Galois field group ring GF $(2^1)$ G, where G is a group of the array elements and 1 is the number of bits of |G|; and
selecting a bijection f from GF $(2^1)$ G to GF $(2^1)$ G encode segments of the array elements.

34. The method of claim 23, wherein the step of obfuscating comprises the step of encoding elements of an array of integers representing the series of components using a combination of one or more of linear mappings and group ring mappings, and one or more parameters of mappings.

35. The method of claim 23, wherein the step of creating comprises the steps of:
converting d of size keySize into a binary representation:

$$d=d1*(2i1)+d2*(2^{i2})+\ldots+dj*(2ij)+\ldots+dt*(2^{it})$$

determining a keyPartitionSize value based upon the bit size of keySize;
creating a keyCoefficients integer array of size keyPartitionSize to store coefficients of the binary representation of d;
creating a keyExponents integer array of size keyPartitionSize to store exponents of the binary representation of d;
choosing keyPartitionSize of values $\{p_1, p_2, \ldots, p_{keyPartitionSize}\}$ such that their sum is keySize;
partitioning a bit-vector OF D into keyPartitionSize consecutive bit-vectors $v_1$ of bit length $p_i$ with value $w_i$, where keyCoefficient[i]=$w_1$ and keyExponents [i] are the bit position of a low-order bit of vi in the bit vector of d,
where i=0, . . . , keyPartitionSize−1; and
defining d such that:

$$d = \sum_{i=1}^{keyPartitionSize} keyCoefficients[i]x2^{keyExponents[i]}.$$

36. The method of claim 35, further including the step of injecting random values into both arrays, the step of injecting comprising the steps of:
creating a coefficientsAndEntropy array to store true values and entropy for the keyCoefficients integer array, and an exponentsAndEntropy array for storing true values and entropy for keyExponents integer array;
setting values of the coefficientsAndEntropy array based on the keySize;
determining an entropyNumber of random values based on the keyPartitionSize;
randomly inserting these random values into the coefficientsAndEntropy array; and
storing indices of the random values in a coefficientEntropyNumberIndices array.

37. The method of claim 36, further including the step of setting the elements of the exponentsAndEntropy array, comprising the steps of:
using the same number of random values entropyNumber;
having the random values lie between 1 and keySize; and
constructing the exponentsAndEntropy array from the keyExponents array and the random values.

38. The method of claim 37, further comprising the step of encoding the coefficientsAndEntropy array and the exponentsAndEntropy array, comprising the steps of:
selecting a non-Abelian group G with order |G|;
selecting a unit u from ZG;
defining a bijection f(x)=xu from ZG to ZG;
creating a coefficientGRElements two-dimensional array and an exponentGRElements two-dimensional array, wherein each sub-array in these two dimensional arrays is a group ring element;
setting the coefficientGRElements array based on the order of G, with elements assigned from coefficientsAndEntropy;
setting the elementsexponentGRElements array based on the order of G, with elements assigned from exponentsAndEntropy;
applying map f to the coefficientGRElements array to form a finalCoefficientGRElements array;
applying map f to the elementexponentGRElements array to form a finalElementexponentGRElements array; and
flattening the finalCoefficientGRElements array and the finalElementexponentGRElements array to a one dimensional array in a cryptosystem program.

39. The method of claim 11 wherein said step of obfuscating comprises the steps of obfuscating said private key by:
generating coefficient and exponent arrays which define said private key; and
storing said coefficient and exponent arrays.

40. The method of claim 11 wherein said step of obfuscating comprises the step of expanding said private key into an arithmetic series.

41. The method of claim 11 wherein said step of obfuscating comprises the step of expanding said private key into an exponential series.

42. The method of claim 11 wherein said step of obfuscating comprises the step of reducing said private key into a set of modulo coordinates.

43. The method of claim 11 wherein said step of obfuscating comprises the step of:
expanding said private key into an addition chain.

44. The method of claim 11 wherein said step of obfuscating comprises the step of:
expanding said private key into the sum of a set of numbers.

45. The method of claim 11 wherein said step of obfuscating comprises the step of:
expanding said private key into the product of a set of factors.

46. The method of claim 11 wherein said step of obfuscating comprises the step of:
expanding said private key into a base-2 polynomial series.

47. The method of claim 11 wherein said step of obfuscating comprises the step of:
expanding said private key using number splitting.

48. The method of claim 11 wherein said step of obfuscating comprises the step of:
splitting said private key arithmetically; and
transmitting an arithmetic component of said private key to a decrypting party.

49. The method as claimed in claim 11, further comprising the step of embedding another one of said parts of said private key in an executable program.

50. A system for secure communication comprising:
a first computer;
a second computer;
a communication network for interconnecting said first computer with said second computer;
said first computer configured to:

generate a private and public key pair;
split said private key into a first part and a second part;
encrypt a message using said public key;
transmit to said second computer:
   said public key;
   said first part of said private key; and
   a program configured to decrypt messages;
obfuscate said second part of said private key; and
transmit said encrypted message and said obfuscated second part of said private key to said second computer;
whereby said second computer can decipher said encrypted message using said first part of said private key and said obfuscated second part of said private key.

51. A computer readable storage memory storing software code that when executed by a processor transforms a software application from a first form to a more secure form by hiding a private key, said code when executed causes the processor to perform the steps of:

generating a private and public key pair at a single server;
splitting said private key into a first part and a second part;
providing to a single client:
   said public key;
   said first part of said private key; and
   a program configured to decrypt messages;
using said public key and a modulus to encrypt a message into a cipher;
obfuscating said second part of said private key; and
providing said cipher and said obfuscated second part of said private key to said client; and
deciphering said cipher at the client using said first part of said private key and said obfuscated second part of said private key.

* * * * *

UNITED STATES PATENT AND TRADEMARK OFFICE
CERTIFICATE OF CORRECTION

PATENT NO. : 7,634,091 B2
APPLICATION NO. : 10/899012
DATED : December 15, 2009
INVENTOR(S) : Zhou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1113 days.

Signed and Sealed this

Ninth Day of November, 2010

David J. Kappos
*Director of the United States Patent and Trademark Office*